US012748265B2

(12) United States Patent
Poe et al.

(10) Patent No.: US 12,748,265 B2
(45) Date of Patent: Sep. 29, 2026

(54) BOOT RELEASE/LOCK SIMPLEX AND DUPLEX OPTICAL CONNECTORS

(71) Applicant: Google LLC, Mountain View, CA (US)

(72) Inventors: Charles Poe, Palo Alto, CA (US); Mathew Berg, Charleston, SC (US)

(73) Assignee: Google LLC, Mountain View, CA (US)

( * ) Notice: Subject to any disclaimer, the term of this patent is extended or adjusted under 35 U.S.C. 154(b) by 691 days.

(21) Appl. No.: 18/131,697

(22) Filed: Apr. 6, 2023

(65) Prior Publication Data

US 2024/0337794 A1 Oct. 10, 2024

(51) Int. Cl.
*G02B 6/38* (2006.01)

(52) U.S. Cl.
CPC ......... *G02B 6/3879* (2013.01); *G02B 6/3825* (2013.01); *G02B 6/3893* (2013.01)

(58) Field of Classification Search
CPC ........................................................ G02B 6/38
See application file for complete search history.

(56) References Cited

U.S. PATENT DOCUMENTS

| | | | | |
|---|---|---|---|---|
| 10,705,300 | B2 * | 7/2020 | Takano | G02B 6/3887 |
| 10,712,512 | B2 * | 7/2020 | Ho | G02B 6/38875 |
| 11,480,741 | B2 | 10/2022 | Ho et al. | |
| 11,747,572 | B2 * | 9/2023 | Wong | G02B 6/3893 385/71 |
| 2004/0247252 | A1 * | 12/2004 | Ehrenreich | G02B 6/3893 385/58 |
| 2019/0384017 | A1 * | 12/2019 | Lu | G02B 6/3885 |
| 2020/0064564 | A1 * | 2/2020 | Ho | G02B 6/3887 |
| 2021/0132302 | A1 * | 5/2021 | Wong | G02B 6/3887 |
| 2021/0278601 | A1 * | 9/2021 | Gniadek | G02B 6/3825 |

(Continued)

FOREIGN PATENT DOCUMENTS

| | | | | |
|---|---|---|---|---|
| EP | 4099068 A1 | | 12/2022 | |
| JP | 2023502392 A | * | 1/2023 | G02B 6/3885 |
| WO | 2012107441 A1 | | 8/2012 | |

(Continued)

OTHER PUBLICATIONS

International Search Report and Written Opinion for PCT Application No. PCT/US2023/033676, dated Mar. 15, 2024. 19 pages.

(Continued)

*Primary Examiner* — Kaveh C Kianni
(74) *Attorney, Agent, or Firm* — Lerner David LLP

(57) ABSTRACT

A connector, for example, for an optical cable, includes a boot associated with a housing of the connector and extending along the optical cable. The boot may be pulled along the cable to disconnect the connector from a receptacle or socket. The connector includes a housing having a first end and a second end, and a flexible latch extending from the housing at the first end and having at least a first operational position and a second operational position. The flexible latch is configured to lockingly engage the connector to a receptacle in the first operational position of the flexible latch. A boot is movably associated with the housing at the second end. The boot is configured to be selectively pulled away from the housing to move the flexible latch into the second operational position. In the second operational position, the flexible latch disengages the connector from the receptacle.

19 Claims, 12 Drawing Sheets

(56) References Cited

U.S. PATENT DOCUMENTS

| | | | | |
|---|---|---|---|---|
| 2022/0221671 | A1 * | 7/2022 | Takano ................ | G02B 6/3879 |
| 2025/0155654 | A1 * | 5/2025 | Mendenhall ......... | G02B 6/3825 |

FOREIGN PATENT DOCUMENTS

| | | | | | |
|---|---|---|---|---|---|
| WO | 2012151175 | A2 | | 11/2012 | |
| WO | WO-2022216861 | A1 | * | 10/2022 | ........... G02B 6/3893 |

OTHER PUBLICATIONS

International Preliminary Report on Patentability for International Application No. PCT/US2023/033676 dated Oct. 16, 2025. 12 pages.

* cited by examiner

BOOT RELEASE/LOCK SIMPLEX AND DUPLEX OPTICAL CONNECTORS

BACKGROUND

Fiber optic connector is a flexible device that can connect and disconnect fiber optic cable quickly. A large variety of fiber connector types are available, including LC (Lucent connector) fiber connector, SC (subscriber-connector) fiber connector, FC (fiber optic connector with a threaded body) fiber connector, and ST (straight tip) fiber connector. Among them, LC fiber optic connector is one of the most common types of fiber optic connectors.

A fiber optic connector is a flexible device that can connect and disconnect fiber optic cable quickly. The LC fiber connector is a small form factor (SFF) connector, which is designed to join LC fibers where a connection or disconnection is required. One type of known LC connector includes a press-down latch to release a lock. However, some transceivers are spaced so close as to not allow finger access space, for example, between two adjacent connectors, to release the known LC connector. Another type of LC connector include pull tabs to unlock the LC connector in a space constrained deployment. Such a pull tab may require extra force to be applied on the pull tab because a significant component of the applied force is devoted to pressing down the unlock pins. Moreover, there is a possibility of damage and/or breakage of the unlock pins because of non-direct application of forces. Further, the pull tab may require additional space/volume which may increase the size of the fiber connectors and make transportation and deployment of the connectors harder.

BRIEF SUMMARY

A connector includes a housing having a first end and a second end; a first flexible latch extending from the housing at the first end and having at least a first operational position and a second operational position, the first flexible latch configured to lockingly engage the connector to a receptacle in the first operational position of the first flexible latch; and a boot movably associated with the housing at the second end. The boot is configured to be selectively pulled away from the housing to move the first flexible latch into the second operational position, wherein, in the second operational position, the first flexible latch disengages the connector from the receptacle.

In one example, the first flexible latch includes a first locking clip and a first terminal cam. The locking clip is configured to lockingly engage the connector of the receptacle in the first operational position of the first flexible latch.

In an example, the boot includes an arm slidably engaged with the housing. The arm includes a first projection and a first aperture configured to removably receive the first terminal cam in the first operational position of the first flexible latch.

In an example, the first flexible latch further incudes a first contoured surface adjacent the first terminal cam, the first contoured surface having a contour complementary to a profile of the first projection of the arm such that the first projection rests on the first contoured surface in the first operational position of the first flexible latch. The boot is configured to cause the projection to slide along the contoured surface when pulled away from the housing.

In an example, the housing includes a stop on a top surface thereof. The arm includes a second aperture configured to accommodate the stop. The boot is configured to extend along a cable.

In one example, the connector includes a first ferrule configured to establish a first optical communication between an optical cable connected to the connector and a receptacle to which the connector is connected. In another example, the connector includes a second ferrule configured to establish a second optical communication between the optical cable and the receptacle.

In another example, the connector includes a second flexible latch including a second locking clip, a second terminal cam, and a second contoured surface adjacent the second terminal cam. The arm includes a third aperture such that the first aperture is configured to receive the first terminal cam and the third aperture is configured to receive the second terminal cam. The arm includes a second projection. The second contoured surface has a second contour complementary to a profile of the second projection of the arm such that the second projection rests on the second contoured surface in the first operational position of the second flexible latch.

According to one example, a system includes a transceiver; a cable; and a connector connected to the cable. The connector includes a housing having a first end and a second end; a first flexible latch extending from the housing at the first end and having at least a first operational position and a second operational position and configured to lockingly engage the connector to the transceiver in the first operational position of the first flexible latch. A boot is movably associated with the housing at the second end. The boot is configured to be selectively pulled away from the housing and cause the first flexible latch to move into the second operational position. In the second operational position, the first flexible latch disengages the connector from the transceiver.

DETAILED DESCRIPTION

An aspect of the disclosure relates to an LC connector with a boot release. Such a boot release facilitates unlocking of the connector in a space constrained deployment, without needing space of finger access. The disclosed LC connector is robust and long-lasting. It will further be understood that while the description refers to an LC connector, the disclosure is not limited to LC connectors only. For example, the disclosure herein may also be applied to other connectors as well where the described boot release can be deployed.

Figure 1A:
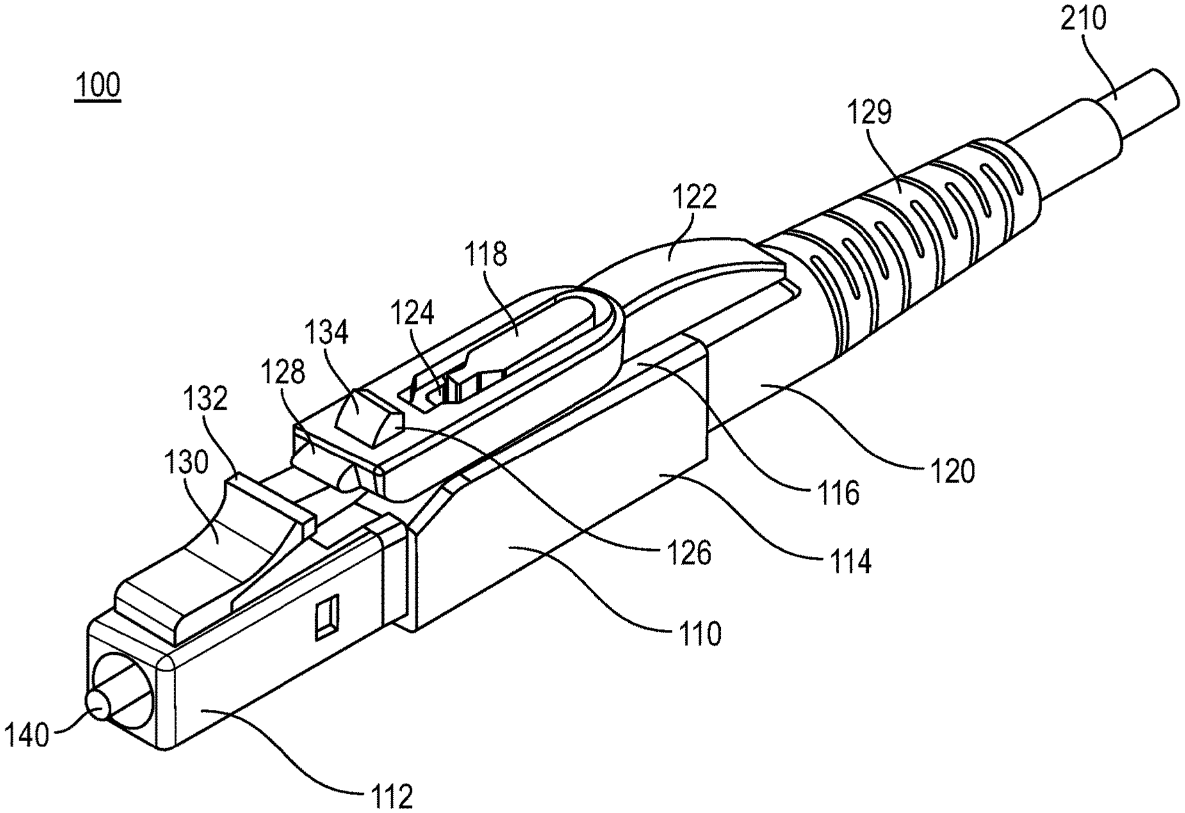
FIG. 1A is a perspective view of a connector according to an example.
Figure 1B:
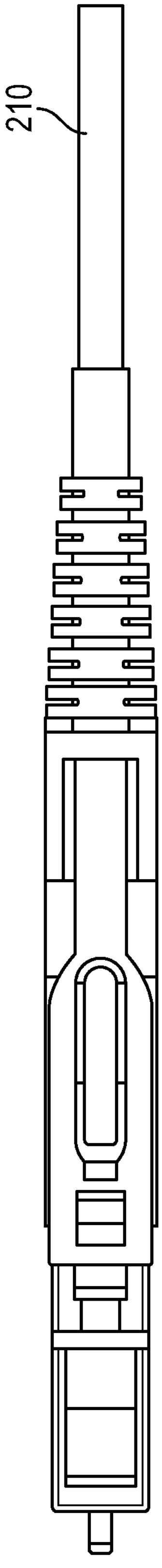
FIG. 1B is a top view of the connector of FIG. 1A.
Figure 1C:
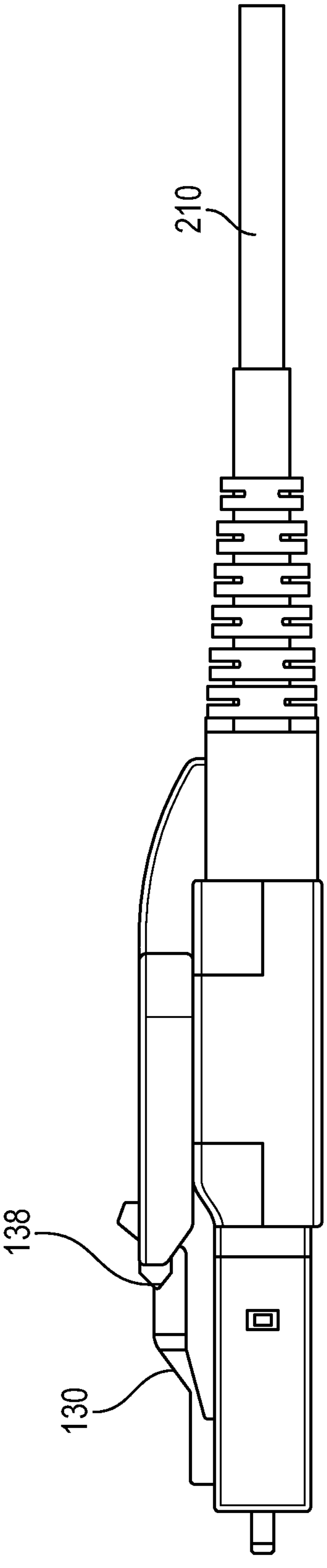
FIG. 1C is an elevational view of the connector of FIG. 1A.

Referring now to FIGS. 1A-1C, an LC connector 100 connected to a simplex LC cable 210 is illustrated according to an example. The connector 100 include a housing 110, a boot 120, a flexible latch 130, and a ferrule 140. The housing 110 has a first end 112 and a second end 114, along a first longitudinal axis. In one example, the first end 112 of the housing 110 may have a first width and the second end 114 of the housing 110 may have a second width. The first and second widths may be the same or may be different from one another. The flexible latch 130 extends at the first end 112 of the housing 110. The flexible latch 130 extends along a second longitudinal axis at an angle to the first longitudinal axis.

The boot 120 surrounds an unlabeled jacket of the LC cable 210 and abuts the housing 110 at the second end 114 in one operational position, for example, illustrated in FIGS. 1A-1C. In a second operational position, the boot 120 is configured to move away from the housing 110 (shown in FIG. 3B) along the cable 210. An arm 122 extends from the boot 120 toward the first end 112 of the housing. In the illustrated example, the boot 120 includes a skeletonized jacket or sleeve 129 surrounding the LC cable 210. As is known in the art, jacket 129 serves to protect the cable 210 excessive bending, which may damage the integrity of the cable 210. The arm 122 is in sliding engagement with a top surface 116 of the housing 110. The ferrule 140 connects the simplex cable 210 to a receptacle for establishing optical communication therebetween.

In an example, the housing 110 includes a stop 118 on the top surface 116. The arm 122 includes a first window or aperture 124 defined therewithin. The first window 124 is configured to accommodate the stop 118. The stop 118 serves to limit the motion of the arm 122 relative to the top surface 116 of the housing 110, thereby also serving to limit the movement of the boot 120 relative to the housing 110. The arm 122 includes a second window or aperture 126 at a free end of the arm 122 and a projection 128 at the free end of the arm 122.

The flexible latch 130 includes a locking clip 132 and a terminal cam 134 at a free end thereof. A contoured surface 136 is defined adjacent the terminal cam 134, extending from the locking clip 132 toward the terminal cam 134. The contoured surface 136 of the flexible latch 130 has a contour complimentary to a profile 138 of the projection 128 of the arm 122 such that the projection 128 rests on the contoured surface 136 in the first operational position of the flexible latch 130. (FIG. 3A) The locking clip 136 and the terminal cam 134 are configured to flexibly move away and toward the housing 110. The locking clip 132 is configured to lockingly engage the connector 100 to a receptacle 200, for example, a transceiver, (FIG. 2A) in a first operational position of the flexible latch 130. In absence of an external force, the flexible latch 132 assumes a position away from the housing 110. The second aperture 126 of arm 122 is configured to removably receive the terminal cam 134 in the first operational position of the flexible latch 130.

The boot 120 is configured to be selectively pulled away from the second end 114 of the housing 110 along the simplex LC cable 210. When the boot 120 is pulled away from the second end 114 of the housing 110, the projection 128 slides along the contoured surface 136 of the flexible latch 130, thereby causing the flexible latch 130 to move into a second operational position toward the housing 110. (FIG. 3B) In the second operational position, the locking clip 132 disengages the connector 100 from the receptacle 200 and the terminal cam 134 moves out of the second aperture 126 of the arm 122. Since the connector 100 is now disengaged from the receptacle 200, the connector 100 and the associated LC cable 210 can be removed and disconnected from the receptacle 200.

In one example, the length of the connector 100 from a tip of the ferrule 140 to an end of the boot 120 is about 50 mm, while a width of the housing 110 is about 5.4 mm. The height of the housing 100 from a bottom surface to a tip of the terminal cam 134 is about 9.7 mm. These dimensions may facilitate the use of the connector 100 with existing ports or sockets for optical communication.

Figure 2A:
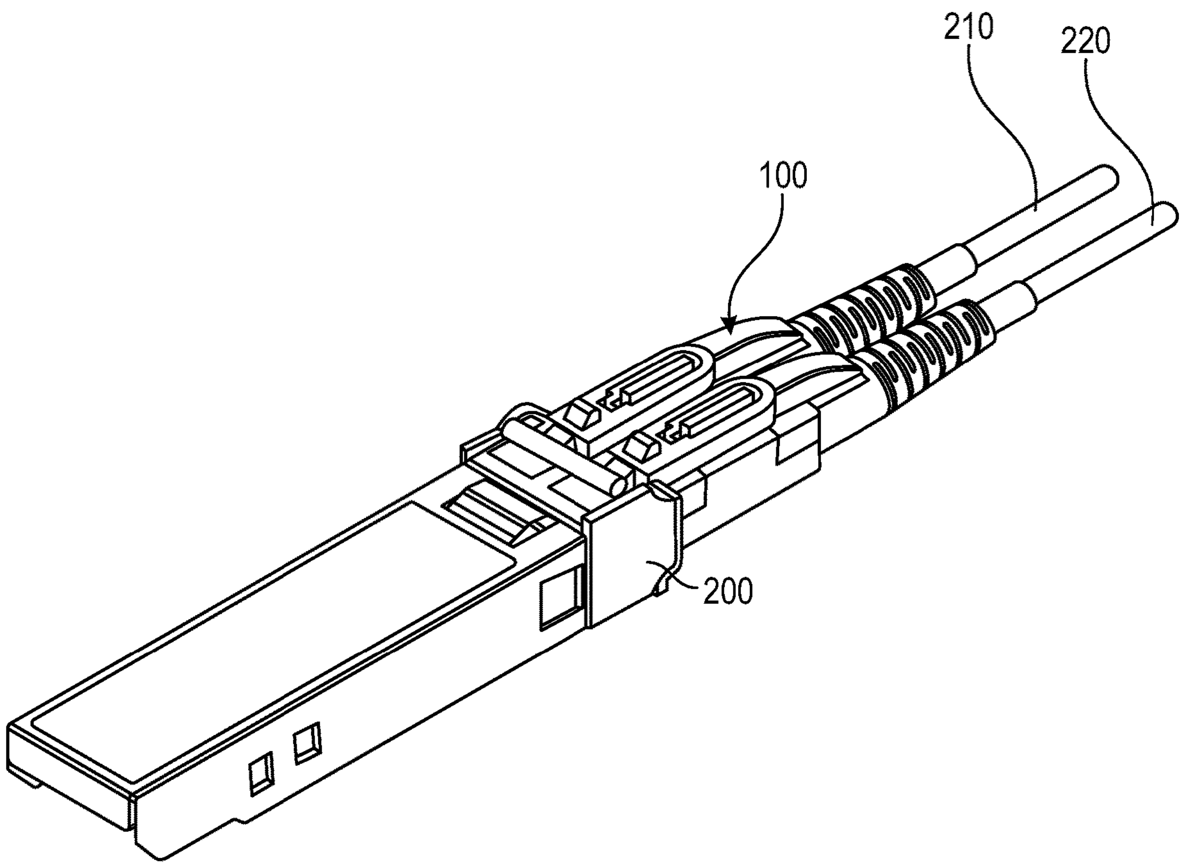
FIG. 2A is a perspective view of an assembly of a transceiver and two connectors of FIG. 1A.
Figure 2B:
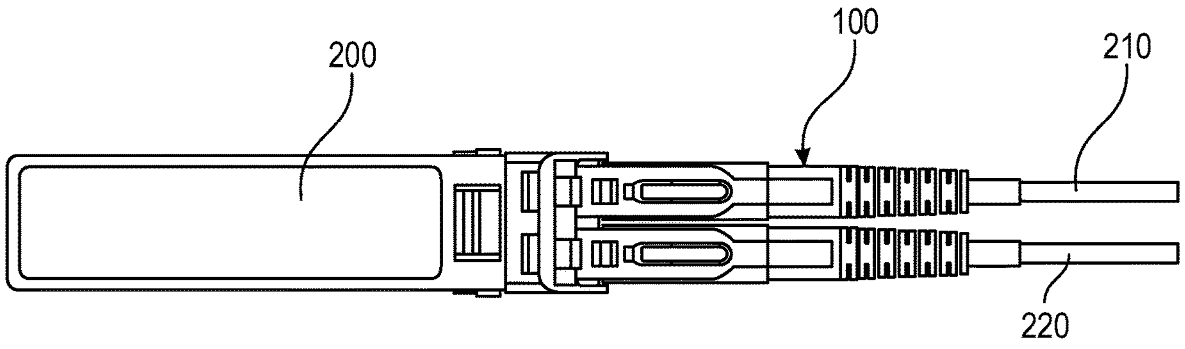
FIG. 2B is a top view of the assembly of FIG. 2A.
Figure 2C:
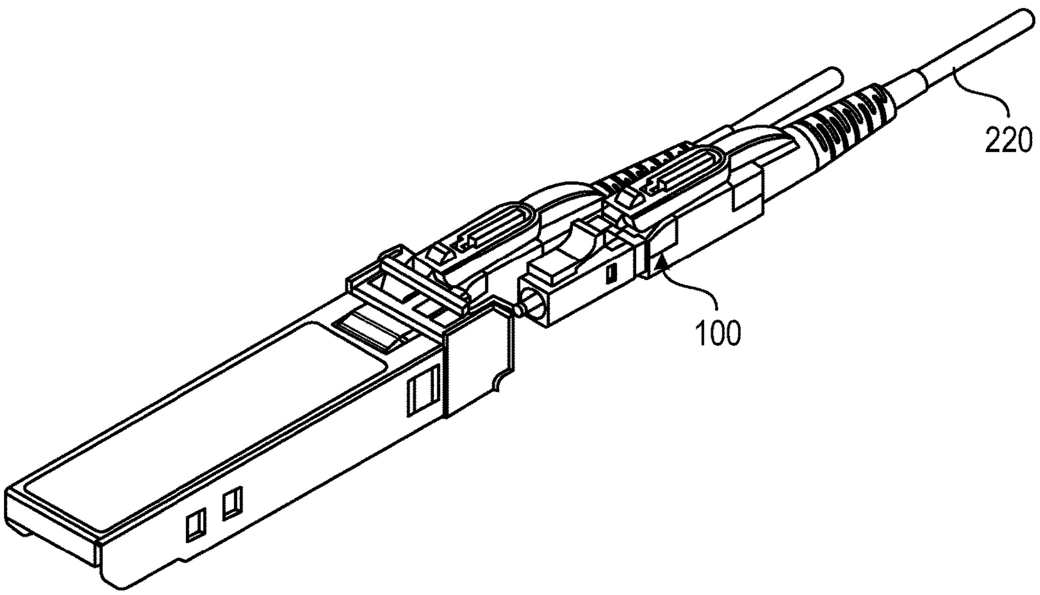
FIG. 2C is a perspective view of the assembly of FIG. 2A, wherein one of the connectors is uncoupled from the transceiver.

Referring to FIGS. 2A-2C, the transceiver 200 and the connector 100 are illustrated. First and second simplex LC cables 210, 220, each having an LC connector 100 associated therewith, are connected to the transceiver 200. FIG. 2A shows a front perspective view of the first and second simplex LC cables 210, 220 connected to the transceiver 200 via the connectors 100, while FIG. 2B shows a top view of the first and second simplex LC cables 210, 220 connected to the transceiver 200 via the connectors 100, in the first operational position of the connectors 100. FIG. 2C shows the simplex LC cable 220 disconnected from the transceiver 200, while the simplex LC cable 210 is still connected to the transceiver 200. The simplex LC cable 220 may be disconnected from the transceiver 200 by pulling the boot 120 away from the housing 110, along the LC cable 220, to disengage the locking clip 132 from the transceiver 200.

Figure 3A:
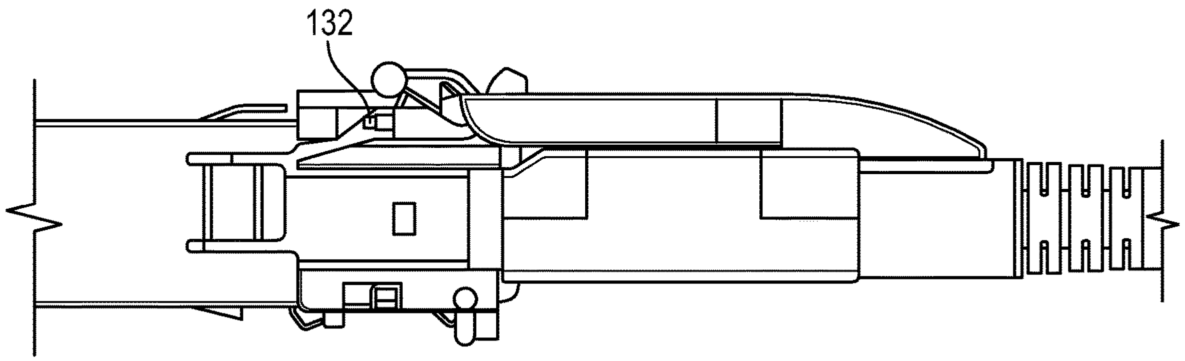
FIG. 3A is an elevational view of the connector of FIG. 1A coupled to a receptacle.
Figure 3B:
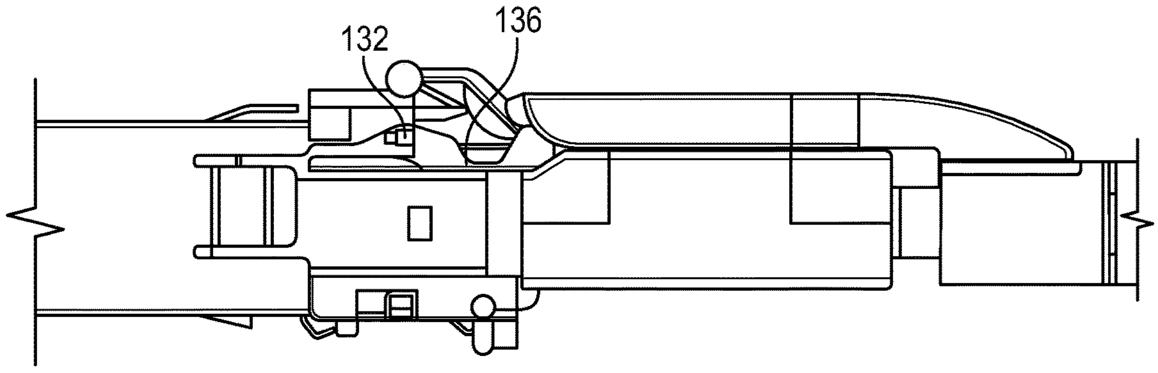
FIG. 3B is an elevational view of the connector of FIG. 3A in the process of being uncoupled from the receptacle.

Referring to FIGS. 3A-3B, the first operational position and the second operational position of the connector 100 are illustrated in side views. FIG. 3A shows the connector 100 extending away from the housing 110 in the first operational position, wherein the connector 100 is lockingly engaged with the receptacle 200. FIG. 3B, on the other hand, shows the connector 100 closer to the housing 110, in the second operational position, wherein the connector 100 is disengaged from the receptacle 200 when the boot 120 is pulled away from the housing 110 along the simplex cable 210. As the boot 120 is pulled away from the housing 110, the arm 120 slides along the top surface 120 of the housing 120 until the stop 118 arrests the further movement of the arm 120 away from the housing 110. As the arm 120 is pulled away from the housing toward the second end 114, the projection 128 pushes the flexible latch 130 down, causing the terminal cam 134 out of the second aperture 126. As the flexible latch 130 is pushed down toward the housing 110, the locking clip

132 disengages from the receptacle 200, thereby disconnecting the connector 100 and the simplex cable 210 from the receptacle 200.

Figure 4A:
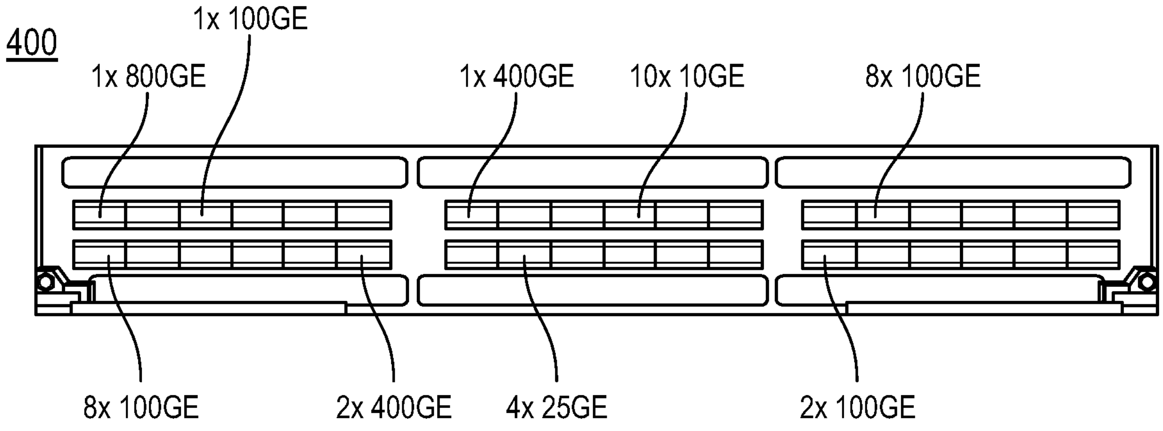
FIG. 4A (PRIOR ART)
FIG. 4A is a front view of a known network switch having a plurality of transceivers.
Figure 4B:
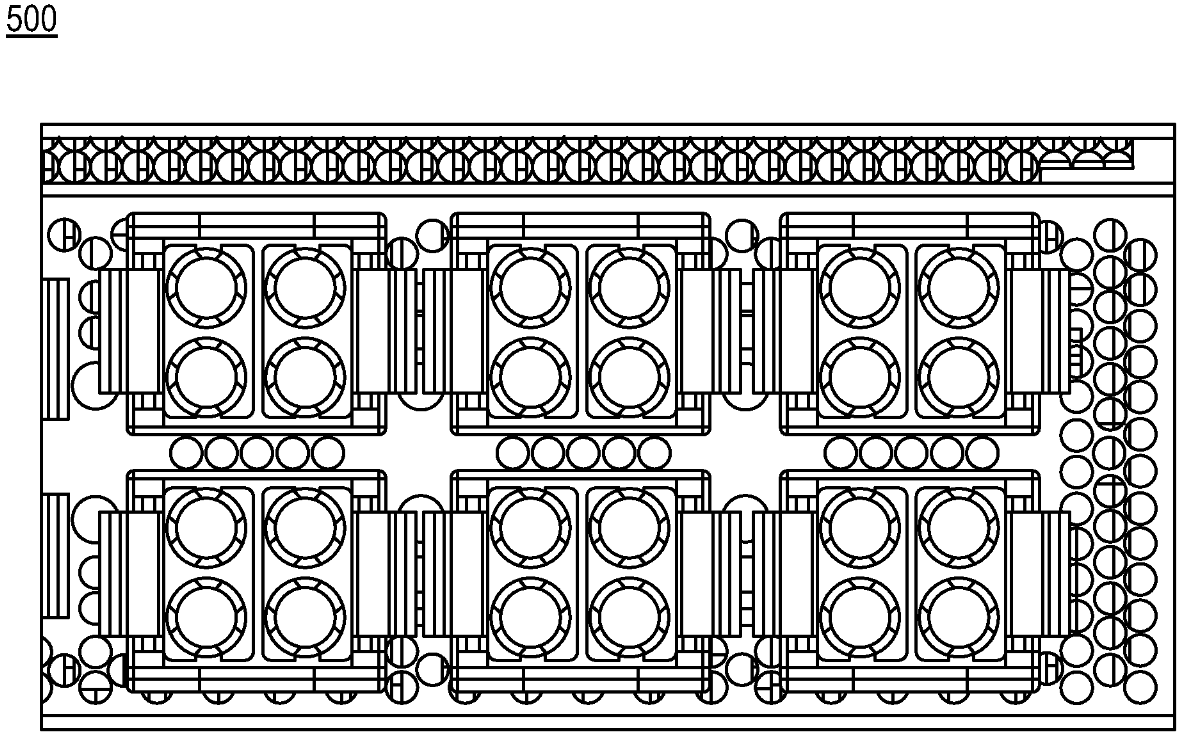
FIG. 4B (PRIOR ART)
FIG. 4B is a front view of another known network switch having a plurality of transceivers.

FIGS. 4A and 4B illustrate two known network switches 400, 500 with known transceivers. The connector 100 described herein is configured to connect to the known transceivers of the network switches 400, 500. As can be seen in FIGS. 4A and 4B, the transceivers are closely packed together, which would allow only a limited, if at all, any finger access space between two adjacent connectors. Multiple cables with connectors 100 can be connected to the known network switches and can be easily disconnected using the boot release as described herein.

Figure 5A:
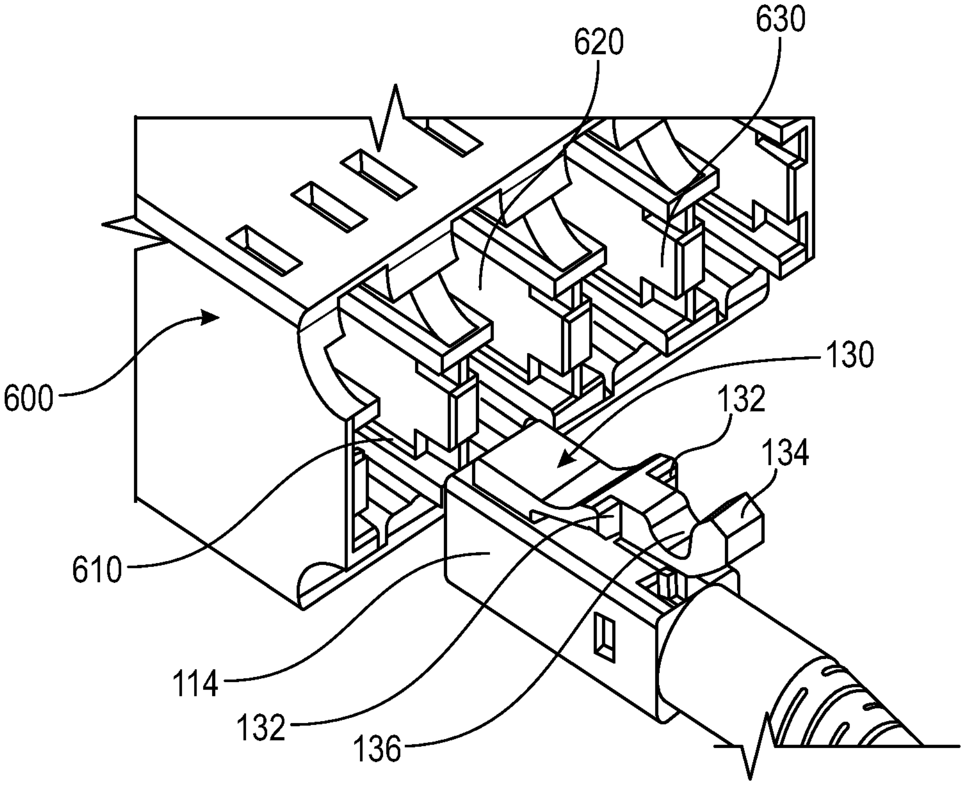
FIG. 5A is a perspective view of a first stage wherein a connector is about to be coupled to a receptacle.
Figure 5B:
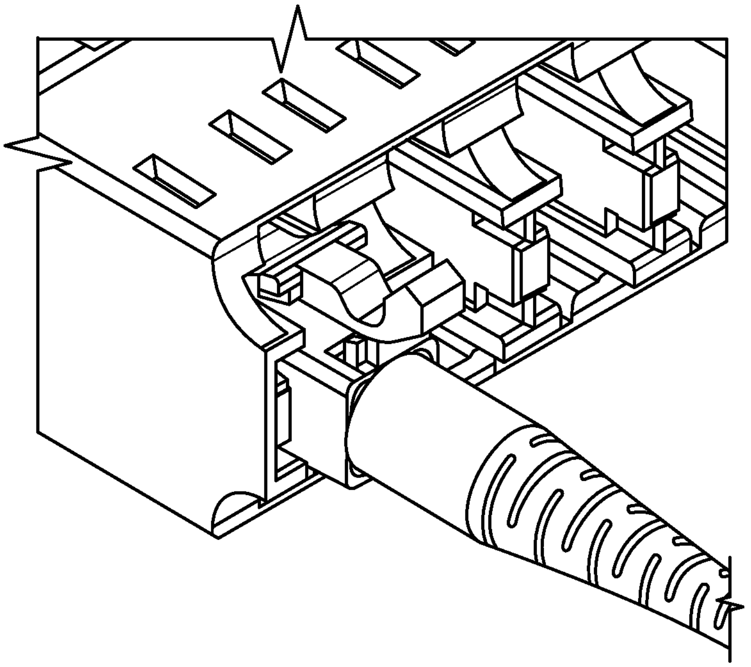
FIG. 5B is a perspective view of an intermediate stage wherein the connector of FIG. 5A is being inserted into the receptacle.
Figure 5C:
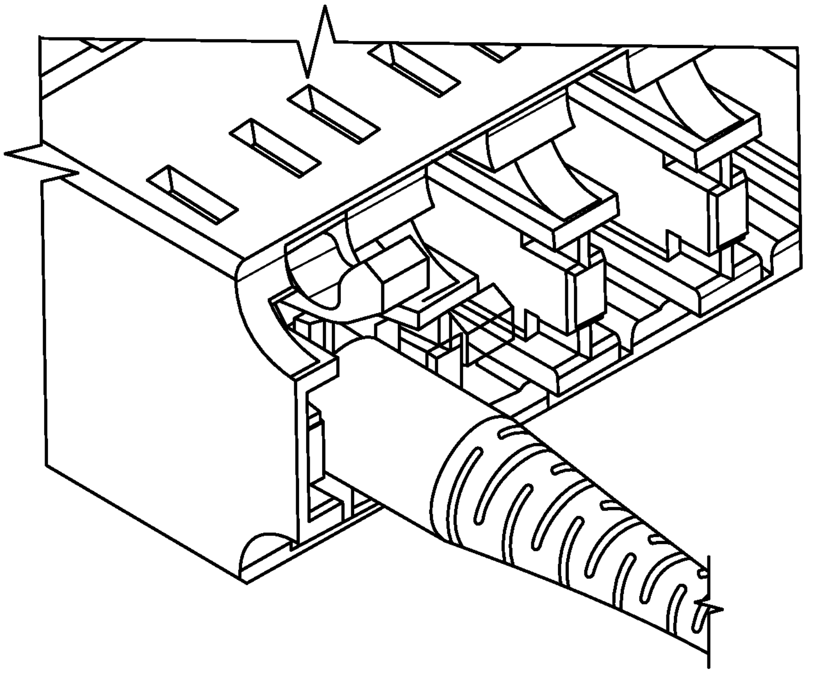
FIG. 5C is a perspective view of a final stage wherein the connector of FIG. 5B is coupled to the receptacle.
Figure 5D:
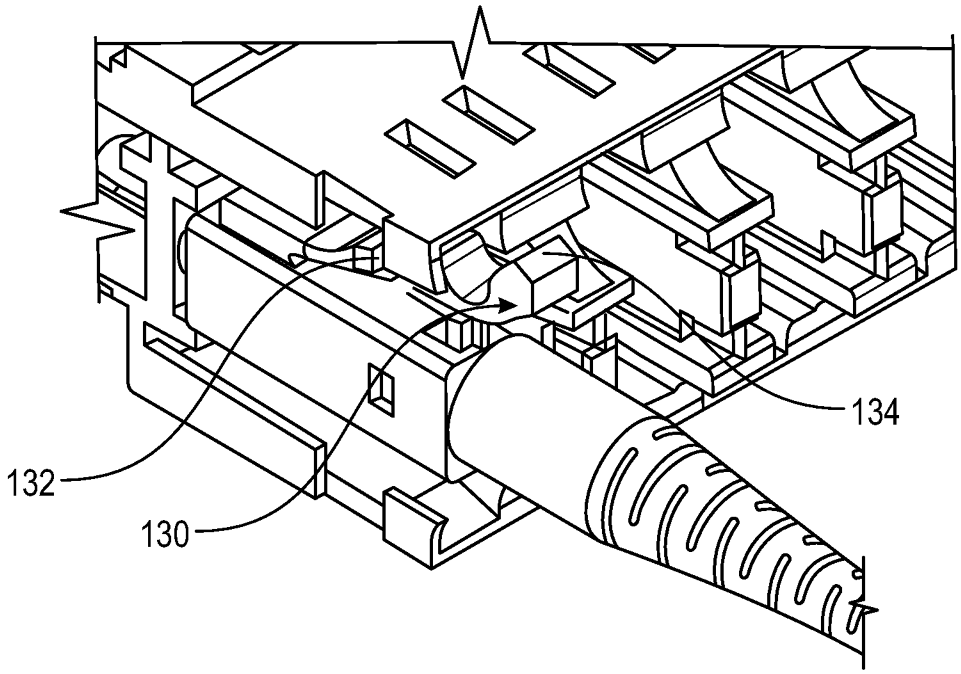
FIG. 5D is a cut-away perspective view of the assembly of FIG. 5C.
Figure 5E:
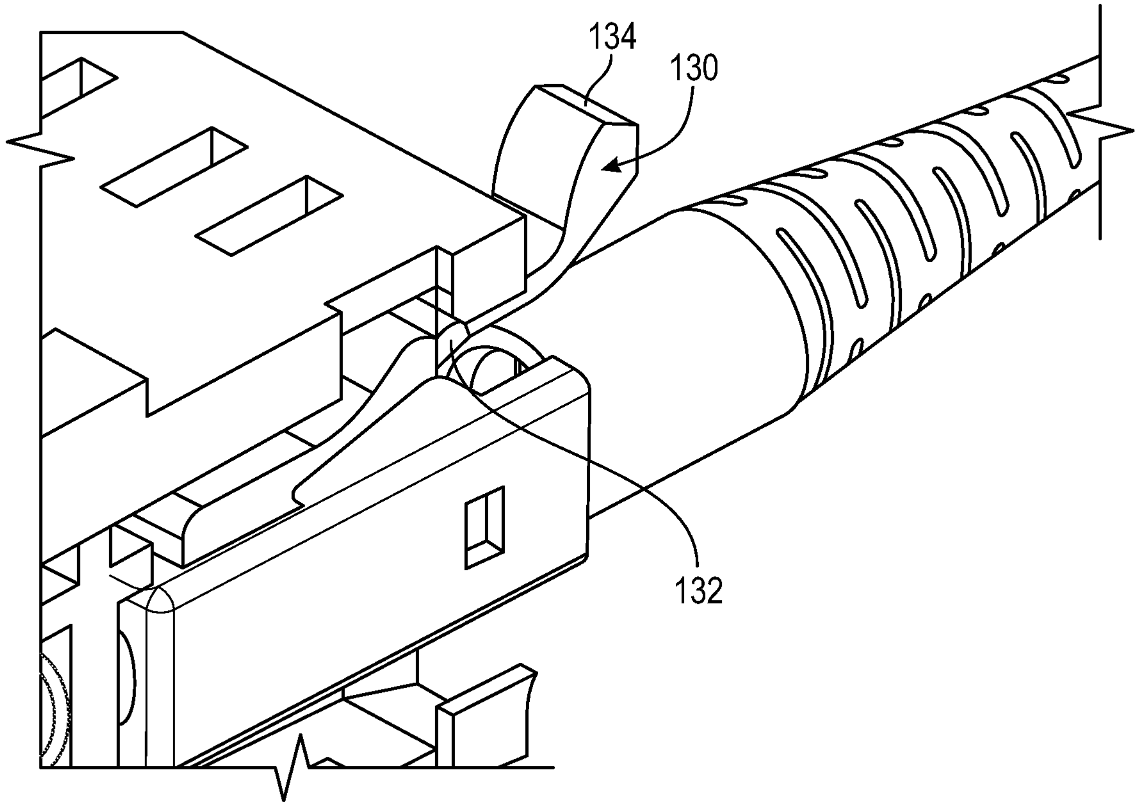
FIG. 5E is another cut-away perspective view of the assembly of FIG. 5C.

Referring now to FIGS. 5A-5E, a partial housing 110 of the connector 100 and an example receptacle 600 are illustrated. For the clarity of the drawings, only the first end 114 of the housing 110 is illustrated, without the second end and the boot release mechanism described above. FIG. 5A shows the first end 114 with the flexible latch 130 with the locking clip 132, the contoured surface 136, and the terminal cam 134. In the illustrated example, the flexible latch 130 extends longitudinally along the housing 110, while the locking clip 132 extends laterally across the flexible latch 130. In the first operational position of the flexible latch 130, when the flexible latch 130 is configured to lockingly engage the connector 100 to a receptacle, the locking clip 132 is configured to rest a first height relative to the housing 110 such that the locking clip 132 urges against the receptacle, as seen in FIGS. 5D and 5E. When the flexible latch 130 is pushed down into the second operational position, the height of the locking clip 132 relative to the housing 110 is lowered such that the locking clip 132 no longer engages the receptacle, thereby unlocking the connector 100 from the receptacle. A receptacle 600 includes a plurality of standard ports or sockets 610, 620, 630, for receiving LC cable connectors, for example, the connector 100.

Referring now to FIGS. 6A-6D, a duplex LC connector 700 is illustrated. The duplex LC connector 700 is generally similar to the simplex LC connector 100 with some differences. For example, the duplex connector 700 includes two ferrules 740A, 740B for connecting a duplex cable 810 to a receptacle for establishing two optical communication channels between the duplex cable 810 and the receptacle. In the illustrated example, the duplex connector 700 includes a housing 710 having a first flexible latch 730A and a second flexible latch 730B. First and second flexible latches 730A, 730B are similar to the flexible latch 130 and includes first and second locking clips 732A, 732B, and first and second terminal cams 734A, 734B, respectively. A boot 720 includes an arm 730. The arm 730 has a first window or aperture 724 similar to the first aperture 124 of the arm 130. However, the arm 730 includes a second aperture or window 736A and a third aperture or window 736B, both of which are similar to the second aperture 136 of the arm 130. The second and third apertures 736A, 736B are configured to accommodate the first and second terminal cams 734A, 734B, respectively. The boot 720 further includes first projection 728A, adjacent the second aperture 736A, and a second projection 728B, adjacent the third aperture 736B. A stop 718 is defined on a top surface of the housing 710, similar to the stop 118.

Figure 6A:
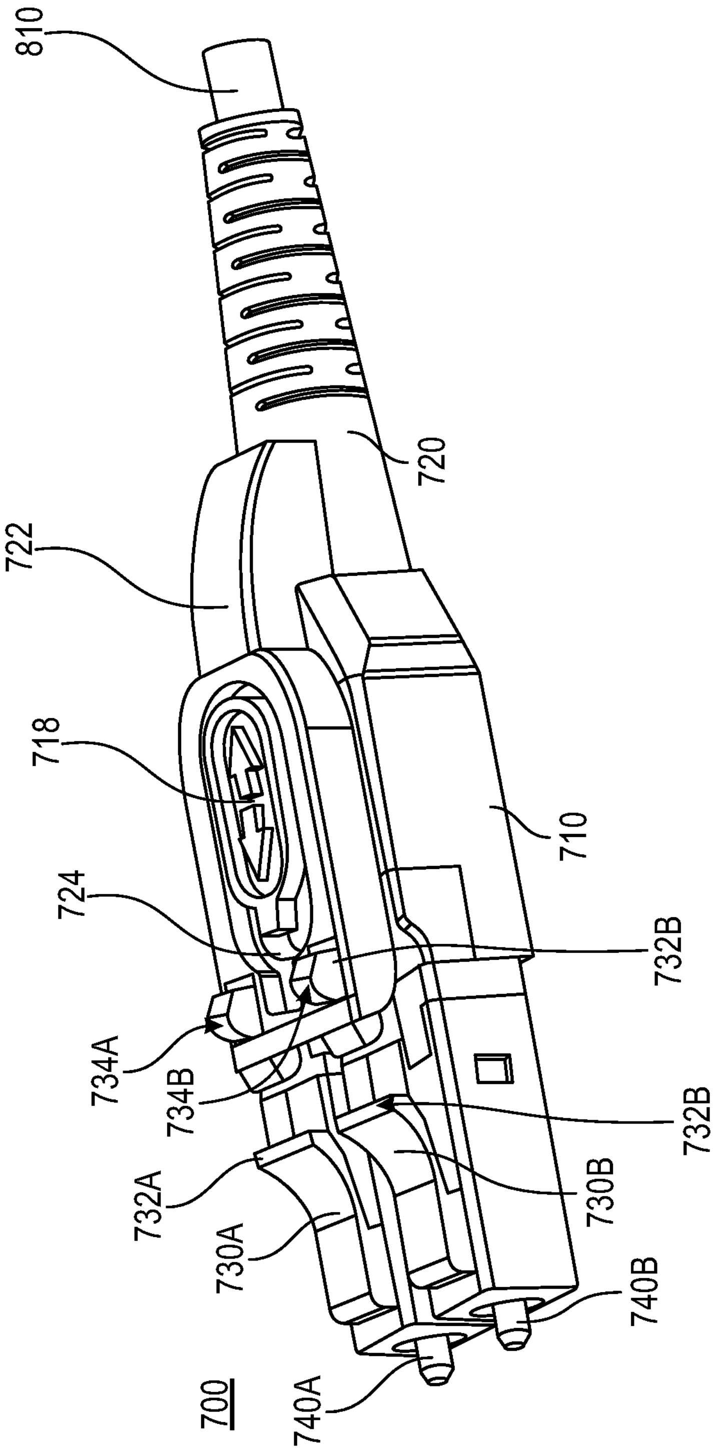
FIG. 6A is a perspective of an example of a duplex connector (without the receptacle) in a locked configuration.
Figure 6B:
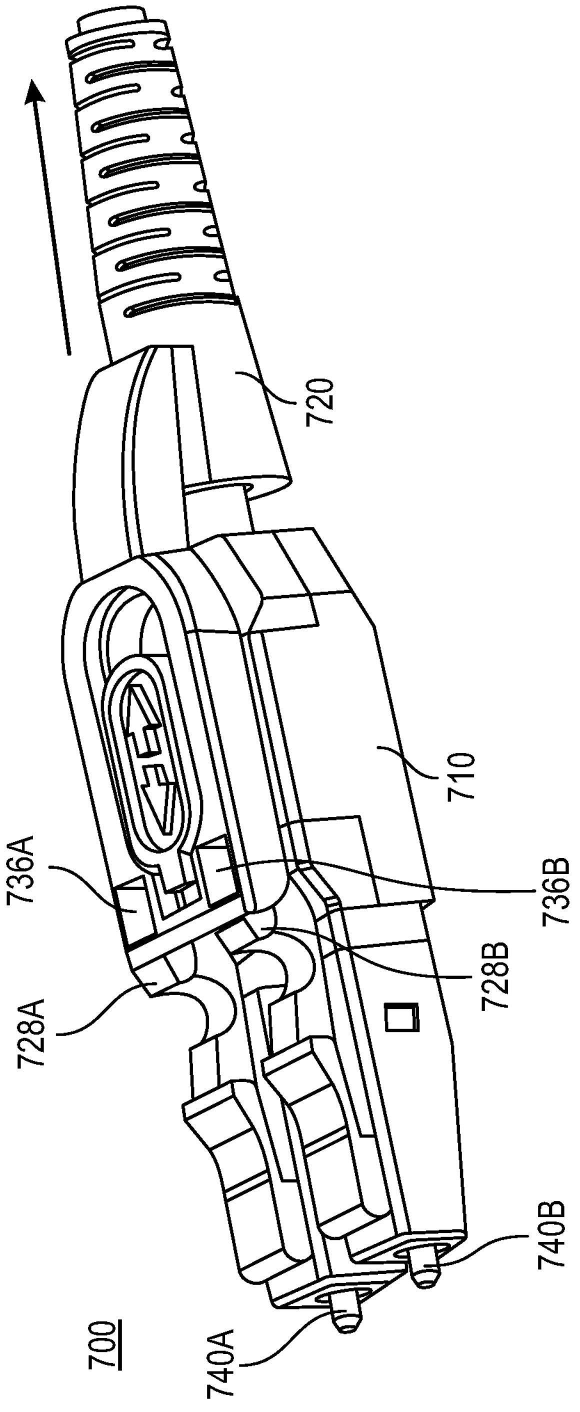
FIG. 6B is a perspective of the duplex connector of FIG. 6A in the process of being uncoupled from a receptacle (not shown)

When the boot 720 is pulled away from the housing 710, as illustrated in FIG. 6B, the projection 728A urges the flexible latch 730A toward the housing 710, while the projection 728B urges the flexible latch 730B down toward the housing 710. The first and second terminal cams 734A, 734B withdraw from the second aperture 736A and the third aperture 736B, respectively. As the first flexible latch 730A and the second flexible latch 730B are pushed downward, the first and second locking clips 732A, 732B disengage from a receptacle, thereby unlocking the connector 710 from the receptacle. The cable 810 along with the connector 700 may then be disconnected from the receptacle.

Figure 6C:
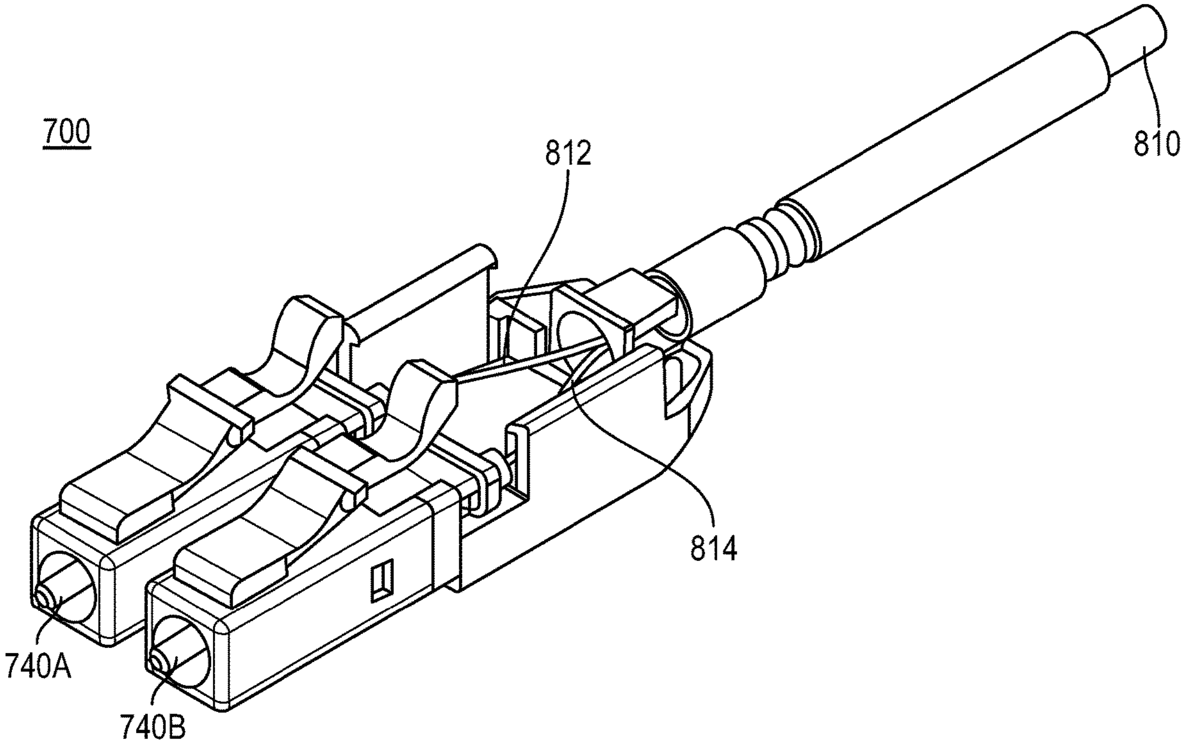
FIG. 6C is an exposed view of the duplex connector of FIG. 6A.

FIG. 6C illustrates an exposed view of the connector 700. The top of the housing 700 and the boot 720 are removed for the sake of clarity. A first channel 812 of the cable 810 is illustrated as being associated with the first ferrule 740A and a second channel 814 of the cable 810 is illustrated as being associated with the second ferrule 740B.

An advantage of the described examples is that the boot release facilitates unlocking of the connector in a space constrained deployment, without needing space for finger access, particularly, between adjacent connectors, which may be positioned close to one another. Another advantage of the described LC connector is that the connector is robust and long-lasting, e.g., repeated or multiple connections and disconnections do not weaken the connector parts. Yet another advantage is that the described connectors are backward compatible, i.e., the connectors may be used to connect optical cables to existing network switches.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the examples should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible examples. Further, the same reference numbers in different drawings can identify the same or similar elements.

The invention claimed is:

1. A connector comprising:

a housing having a first end and a second end;

a first flexible latch extending from the housing at the first end and having at least a first operational position and a second operational position, the first flexible latch configured to lockingly engage the connector to a receptacle in the first operational position of the first flexible latch; and a boot movably associated with the housing at the second end, wherein the boot is configured to be selectively pulled away from the housing to cause the first flexible latch to move into the second operational position, wherein, in the second operational position, the first flexible latch disengages the connector from the receptacle, and wherein the first flexible latch comprises a first locking clip and a first terminal cam.

2. The connector according to claim 1, wherein the locking clip is configured to lockingly engage the connector of the receptacle in the first operational position of the first flexible latch.

3. The connector according to claim 1, wherein the boot is configured to extend along a cable.

4. The connector according to claim 1, further comprising a first ferrule configured to establish a first optical communication channel between an optical cable connected to the connector and a receptacle to which the connector is connected.

5. The connector according to claim 4, further comprising a second ferrule configured to establish a second optical communication channel between the optical cable and the receptacle.

6. A connector comprising:

a housing having a first end and a second end;

a first flexible latch extending from the housing at the first end and having at least a first operational position and a second operational position, the first flexible latch configured to lockingly engage the connector to a receptacle in the first operational position of the first flexible latch; and a boot movably associated with the housing at the second end, wherein the boot is configured to be selectively pulled away from the housing to cause the first flexible latch to move into the second operational position, wherein, in the second operational position, the first flexible latch disengages the connector from the receptacle, and wherein the boot comprises an arm slidably engaged with the housing, the arm comprising a first projection and a first aperture configured to removably receive the first terminal cam in the first operational position of the first flexible latch.

7. The connector according to claim 6, wherein the first flexible latch further comprises a first contoured surface adjacent the first terminal cam, the first contoured surface having a contour complementary to a profile of the first projection of the arm such that the first projection rests on the first contoured surface in the first operational position of the first flexible latch.

8. The connector according to claim 7, wherein the boot is configured to cause the projection to slide along the contoured surface when pulled away from the housing.

9. The connector according to claim 6, wherein the housing comprises a stop on a top surface thereof.

10. The connector according to claim 9, wherein the arm comprises a second aperture configured to accommodate the stop.

11. A connector comprising:

a housing having a first end and a second end;

a first flexible latch extending from the housing at the first end and having at least a first operational position and a second operational position, the first flexible latch configured to lockingly engage the connector to a receptacle in the first operational position of the first flexible latch;

a second flexible latch comprising a second locking clip, a second terminal cam, and a second contoured surface adjacent the second terminal cam, a boot movably associated with the housing at the second end, wherein the boot is configured to be selectively pulled away from the housing to cause the first flexible latch to move into the second operational position, wherein, in the second operational position, the first flexible latch disengages the connector from the receptacle.

12. The connector according to claim 11, wherein the boot comprises an arm slidably engaged with the housing, the arm comprising a first projection and a first aperture configured to removably receive the first terminal cam in the first operational position of the first flexible latch, and wherein the arm comprises a third aperture such that the first aperture is configured to receive the first terminal cam and the third aperture is configured to receive the second terminal cam.

13. The connector according to claim 12, wherein the arm comprises a second projection, and wherein the second contoured surface has a second contour complementary to a profile of the second projection of the arm such that the second projection rests on the second contoured surface in the first operational position of the second flexible latch.

14. A system comprising:

a transceiver;

a cable; and a connector connected to the cable, wherein the connector comprises:

a housing having a first end and a second end;

a first flexible latch extending from the housing at the first end and having at least a first operational position and a second operational position, the first flexible latch configured to lockingly engage the connector to the transceiver in the first operational position of the first flexible latch; and a boot movably associated with the housing at the second end, wherein the boot is configured to be selectively pulled away from the housing and to cause the first flexible latch to move into the second operational position, wherein, in the second operational position, the first flexible latch disengages the connector from the transceiver.

15. The system of claim 14, wherein the connector further comprises a first ferrule configured to establish a first optical communication between the cable and the transceiver.

16. The system of claim 15, wherein the connector further comprises a second ferrule configured to establish a second optical communication between the cable and the transceiver.

17. The system of claim 14, wherein the first flexible latch comprises a first locking clip and a first terminal cam.

18. The system of claim 17, wherein the boot comprises an arm slidably engaged with the housing, the arm comprising a first projection and a first aperture configured to removably receive the first terminal cam in the first operational position of the first flexible latch.

19. The system of claim 17, wherein the connector further comprises a second flexible latch comprising a second locking clip, a second terminal cam, and a second contoured surface adjacent the second terminal cam.

* * * * *